United States Patent
Kuboki et al.

(10) Patent No.: US 6,413,679 B1
(45) Date of Patent: Jul. 2, 2002

(54) BATTERY WITH AN ADDITIVE TO EVOLVE A GAS AT HIGH TEMPERATURE

(75) Inventors: Takashi Kuboki, Tama; Takahisa Ohsaki, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/525,048

(22) Filed: Mar. 14, 2000

(30) Foreign Application Priority Data

Mar. 15, 1999 (JP) .......................................... 11-068668

(51) Int. Cl.[7] .......................... H01M 2/12; H01M 10/08
(52) U.S. Cl. ...................................... 429/347; 429/324
(58) Field of Search ................................ 429/347, 324, 429/332

(56) References Cited

U.S. PATENT DOCUMENTS

| | | | | |
|---|---|---|---|---|
| 5,681,669 A | * | 10/1997 | Yoshio | 429/194 |
| 5,755,985 A | * | 5/1998 | Vallee | 252/62.2 |
| 5,830,600 A | | 11/1998 | Narang et al. | |
| 5,922,494 A | * | 7/1999 | Barker | 429/342 |

FOREIGN PATENT DOCUMENTS

| | | |
|---|---|---|
| JP | 10-270011 | 10/1998 |
| JP | 11-67275 | 3/1999 |

* cited by examiner

*Primary Examiner*—Gabrielle Brouillette
*Assistant Examiner*—Mark Ruthkosky
(74) *Attorney, Agent, or Firm*—Oblon, Spivak, McClelland, Maier & Neustadt, P.C.

(57) ABSTRACT

Disclosed is a battery which has means which, upon the occurrence of an abnormal phenomenon, such as an overcharge or an external short circuit, rapidly operates a safety mechanism, such as a current breaking valve, to ensure the safety of the battery and which, particularly upon the occurrence of an abnormal phenomenon, can surely and stably increase the pressure within the battery. The battery comprises a positive electrode, a negative electrode, a separator, an electrolysis solution, and a hermetically sealed container, the hermetically sealed container containing in its interior a compound represented by formula (1):

$$X\text{—}O\text{—}CO\text{—}R \tag{1}$$

wherein X represents a group which, upon decomposition of the compound caused by a rise in temperature, is eliminated to evolve a gas insoluble or slightly soluble in the electrolysis solution; and R represents a group which controls the decomposition temperature of the compound.

33 Claims, 2 Drawing Sheets

BATTERY WITH AN ADDITIVE TO EVOLVE A GAS AT HIGH TEMPERATURE

TECHNICAL FIELD

The present invention relates to a battery, and more particularly to a battery which has means which, upon the occurrence of an abnormal phenomenon, such as an overcharge or an external short circuit, rapidly operates a safety mechanism, such as a current breaking valve, to ensure the safety of the battery.

BACKGROUND OF THE INVENTION

The spread of portable equipment, such as portable telephones, potable information terminal equipment, and personal computers, has led to an increasing demand for batteries having high energy density. This in turn has led to studies on an increase in capacity. On the other hand, with an increase in the energy density of batteries, an improvement in safety has become important. This is for ensuring safety upon the occurrence of abnormal phenomenon derived from wrong use by a user or malfunction of a circuit. For example, a mechanism (current breaking valve) for breaking current in response to a rise in pressure within the battery and a mechanism (rupture) for releasing internal pressure have been developed and put to practical use. Upon a mistake of connection or malfunction of a charge control circuit, these mechanisms break the current or release the internal pressure before the flow of large current or an increase in battery voltage above a predetermined value causes a dangerous state.

The placement of a material capable of evolving a gas within the battery has been proposed to rapidly increase the pressure within the battery upon the occurrence of an abnormal phenomenon. For example, in a rechargeable battery with a nonaqueous electrolysis solution, the addition of lithium carbonate to a positive electrode has been proposed to enable lithium carbonate to be decomposed upon overcharge to evolve carbon dioxide gas which operates the current breaking valve.

Lithium carbonate as the conventional material, however, is decomposed upon an increase in voltage as a result of the overcharge, and cannot respond to the occurrence of an abnormal phenomenon, which lowers voltage, for example, external short circuit. Further, the gas evolved is carbon dioxide which is easily dissolved in the electrolysis solution. Therefore, the pressure rise rate upon the occurrence of abnormal phenomenon is not necessarily satisfactory.

In view of the above problems of the prior art, the present invention has been made, and it is an object of the present invention to provide a battery which has means which, upon the occurrence of an abnormal phenomenon, such as an overcharge or an external short circuit, rapidly operates a safety mechanism, such as a current breaking valve, to ensure the safety of the battery and which, particularly upon the occurrence of an abnormal phenomenon, can surely and stably increase the pressure within the battery.

The above object of the present invention is attained by a battery comprising a positive electrode, a negative electrode, a separator, an electrolysis solution, and a hermetically sealed container, the hermetically sealed container containing in its interior a compound represented by formula (1):

$$X\text{—}O\text{—}CO\text{—}R \quad (1)$$

wherein X represents a group which, upon decomposition of the compound caused by a rise in temperature, is eliminated to evolve a gas insoluble or slightly soluble in the electrolysis solution; and R represents a group which controls the decomposition temperature of the compound, the group R having, in the form of a compound represented by chemical formula $RH^1$, a hydrogen atom $H^1$ with an acid dissociation equilibrium constant (pKa) of not more than 13.

According to the present invention, the group X in formula (1) preferably represents a substituted or unsubstituted alkyl group having 3 to 7 carbon atoms and is specifically selected from the group consisting of substituted or unsubstituted propyl, butyl, and pentyl groups.

According to a preferred embodiment of the present invention, the hydrogen atom $H^1$ in the compound represented by chemical formula $RH^1$ is bonded to an oxygen or nitrogen atom.

According to the present invention, the decomposition temperature of the compound represented by formula (1) can be regulated in the range of 100 to 150° C. by properly selecting the group R.

For example, in formula (1), when the group X represents a tert-butyl group, the compound is rapidly decomposed upon a temperature rise to evolve carbon dioxide, 2-methylpropene, and a compound represented by chemical formula $RH^1$. In this case, since 2-methylpropene has low solubility in both water electrolysis solution and nonaqueous electrolysis solution, the pressure within the battery can be rapidly increased to operate the current breaking valve or the rupture.

DETAILED DESCRIPTION OF THE INVENTION

Figure 1:
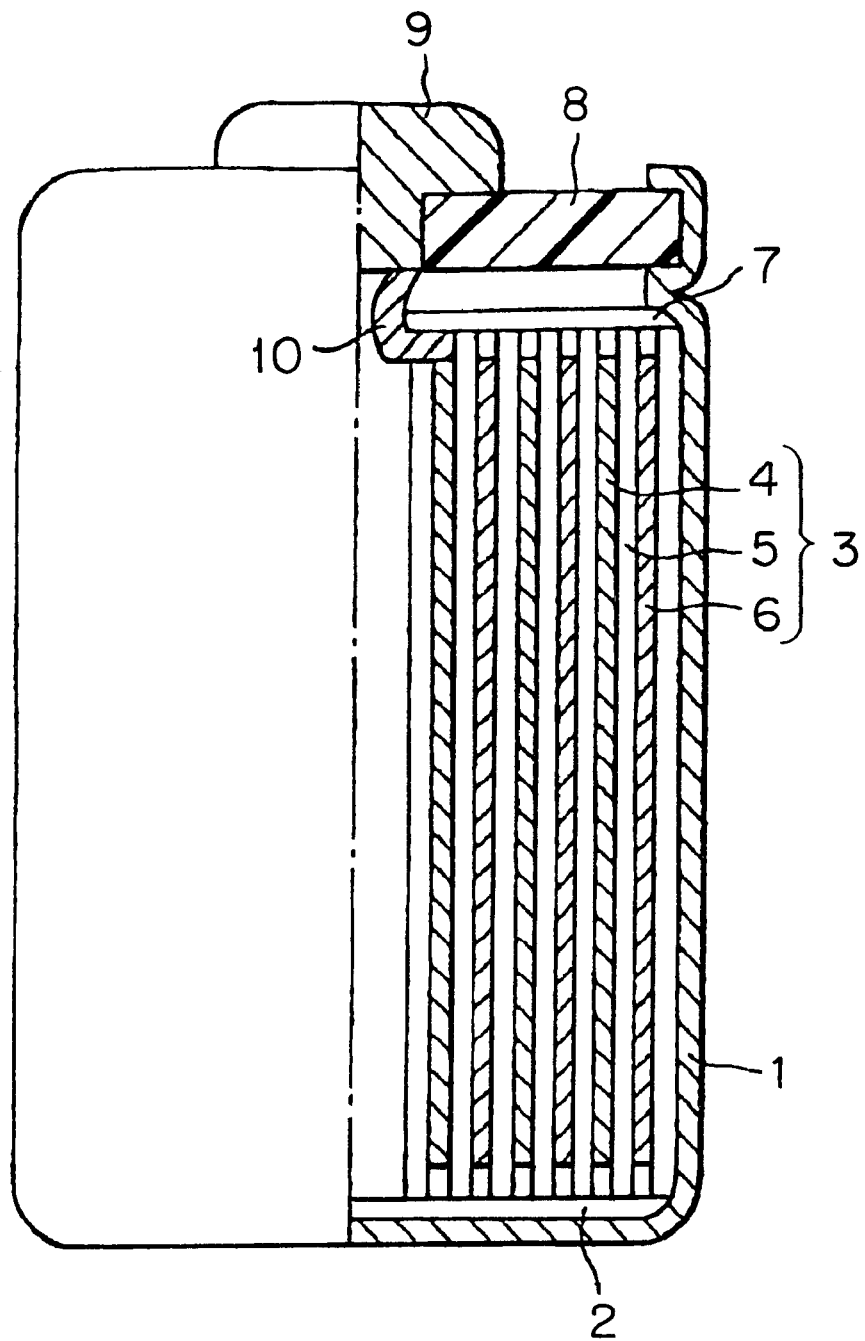
FIG. 1 is a partially sectional view of a cylindrical rechargeable battery with a nonaqueous electrolysis solution according to the present invention.

The construction of the battery according to the present invention will be described in more detail by taking a rechargeable battery with a nonaqueous electrolysis solution (for example, a lithium ion rechargeable battery) with reference to the accompanying drawings.

For example, in a specific example of the rechargeable battery with a nonaqueous electrolysis solution according to the present invention, a group of electrodes 2 are housed within a cylindrical external material 1 made of iron. The group of electrodes 2 each comprises: a positive electrode 5 having a structure wherein, for example, a positive electrode layer 4 is supported on a current collector 3 formed of a conductive substrate; a negative electrode 8 having a structure wherein, for example, a negative electrode layer 7 is supported on a collector 6 formed of a conductive substrate; and a separator 9. The nonaqueous electrolysis solution 1 is placed within the external material 1. The positive electrode 5 in its one end is connected to a positive electrode terminal 10. On the other hand, the negative electrode 8 in its one end is connected to the external material 1 and functions as a negative electrode terminal.

The constructions of the positive electrode 5, the negative electrode 8, the separator 9, and the nonaqueous electrolysis solution are as follows.

1) Positive Electrode 5

The positive electrode 5 has a structure such that a positive electrode layer 4 containing an active material is supported on a current collector 3.

The positive electrode 5 may be prepared, for example, by mixing a positive electrode active material with a conductive agent and a binder, suspending the mixture in a suitable solvent, coating the suspension onto a current collector, drying the coated current collector, and forming the dried, coated current collector into a sheet.

Positive electrode active materials usable herein include: various oxides, for example, manganese dioxides, lithium-containing manganese oxides, lithium-containing manganese aluminum oxides, lithium-containing manganese iron oxides, lithium-containing manganese aluminum iron oxides, lithium-containing nickel oxides, lithium-containing cobalt oxides, lithium-containing nickel cobalt oxides, lithium-containing iron oxides, and lithium-containing vanadium oxides; and chalcogen compounds, such as titanium disulfide and molybdenum disulfide. Among them, lithium-containing cobalt oxides (for example, $LiCoO_2$), lithium-containing nickel cobalt oxides (for example, $LiNi_{0.8}Co_{0.2}O_2$), lithium-containing manganese oxides (for example, $LiMn_2O_4$ and $LiMnO_2$) are preferred because high voltage can be provided.

Examples of conductive agents usable herein include acetylene black, carbon black, graphite, metals, and metal oxides.

Examples of binders usable herein include polytetrafluoroethylene (PTFE), polyvinylidene fluoride (PVdF), ethylene-propylene-butadiene rubber (EPBR), and styrene-butadiene rubber (SBR).

The mixing ratio among the positive electrode active material, the conductive agent, and the binder is preferably 80to 95% by weight for the positive electrode active material, 3 to 20% by weight for the conductive agent, and 2 to 7% by weight for the binder.

A conductive substrate-may be used as the current collector. The conductive substrate may be made of, for example, aluminum, stainless steel, or nickel. The thickness of the conductive substrate is preferably in the range of 15 to 100 $\mu$m. When the thickness is less than 15 $\mu$m, there is a possibility that the strength of the positive electrode is unsatisfactory. On the other hand, a thickness exceeding 100 $\mu$m results in increased battery weight and increased thickness of the group of electrodes. This probably makes it difficult to satisfactorily enhance the weight energy density and the volume energy density of thin rechargeable batteries. The thickness of the conductive substrate is more preferably in the range of 30 to 80 $\mu$m.

2) Negative Electrode 8

The negative electrode 8 has a structure such that a negative electrode layer 7 is supported on a current collector 6.

The negative electrode 8 may be prepared, for example, by kneading a carbonaceous material capable of occluding and releasing lithium ions with a binder in the presence of a solvent, coating the resultant suspension onto a current collector, drying the coated current collector, and then subjecting the dried, coated current collector to pressing once at a desired pressure or multi-stage pressing twice to five times at a desired pressure.

Carbonaceous materials usable herein include: graphitic or carbonaceous materials, such as graphite, coke, carbon fiber, and spheroidal carbon; and graphitic or carbonaceous materials prepared by heat treating thermosetting resin, isotropic pitch, mesophase pitch, mesophase pitch-derived carbon fiber, or microspherical mesophase at 500 to 3000° C. Among others, graphitic materials having graphite crystal are preferred which are prepared by adopting 2,000° C. or above as the heat treatment temperature and has a plane spacing d002 in (002) plane of not more than 0.340 nm. The rechargeable battery, with a nonaqueous electrolysis solution, comprising a negative electrode containing a graphitic material as the carbonaceous material can significantly improve battery capacity and large current characteristics. The plane spacing d002 is more preferably not more than 0.336 nm.

Binders usable herein include, for example, polytetrafluoroethylene (PTFE), polyvinylidene fluoride (PVdF), ethylene-propylene-butadiene rubber (EPBR), styrene-butadiene rubber (SBR), and carboxymethylcellulose (CMC).

The mixing ratio between the carbonaceous material and the binder is preferably 80 to 98% by weight for the carbonaceous material and 2 to 20% by weight for the binder. In particular, the amount of the carbonaceous material is preferably in the range of 5 to 20 $g/m^2$ in the form of the negative electrode.

The current collector may be the conductive substrate as described above. The conductive substrate may be made of, for example, copper, stainless steel, or nickel. The thickness of the conductive substrate is preferably in the range of 10 to 50 $\mu$m. When the thickness is less than 10 $\mu$m, there is a possibility that the strength of the negative electrode is unsatisfactory. On the other hand, a thickness exceeding 50 $\mu$m results in increased battery weight and increased thickness of the group of electrodes. This probably makes it difficult to satisfactorily enhance the weight energy density and the volume energy density of thin rechargeable batteries.

Materials for the negative electrode include, in addition to the above materials containing carbonaceous materials capable of occluding and releasing lithium ions, materials containing a metal oxide, a metal sulfide, or a metal nitride, and materials composed of a lithium metal or a lithium alloy.

Metal oxides usable herein include, for example, tin oxide, silicon oxide, lithium titanium oxide, niobium oxide, and tungsten oxide.

Metal sulfides usable herein include, for example, tin sulfide and titanium sulfide.

Metal nitrides usable herein include, for example, lithium cobalt nitride, lithium iron nitride, and lithium manganese nitride.

Lithium alloys usable herein include, for example, lithium aluminum alloy, lithium tin alloy, lithium lead alloy, and lithium silicon alloy.

3) Separator 9

For example, porous films including polyethylene, polypropylene, or PVdF films, or nonwoven fabrics of synthetic resins may be used as the separator 9. Among others, a porous film formed of polyethylene, polypropylene, or both polyethylene and polypropylene is preferred because this porous film can improve the safety of the rechargeable battery.

The thickness of the separator is preferably not more than 30 $\mu$m. When the thickness exceeds 30 $\mu$, the distance between the positive electrode and the negative electrode is increased, leading to a possibility that the internal resistance is increased. The lower limit of the thickness is preferably 5 $\mu$m. When the thickness is less then 5 $\mu$m, there is a possibility that the strength of the separator is significantly lowered. This is likely to cause an internal short circuit. The upper limit of the thickness is more preferably 25 $\mu$m, and the lower limit of the thickness is more preferably 10 $\mu$m.

The separator preferably has a percentage heat shrinkage of not more than 20% as measure under conditions of 120° C. and one hr. When the percentage heat shrinkage exceeds 20%, it would be difficult to provide satisfactory adhesive strength between the positive and negative electrodes and the separator. The percentage heat shrinkage is more preferably not more than 15%.

The separator preferably has a porosity of 30 to 60%. The reason for this as follows. When the porosity is less than 30%, it would be difficult to provide high electrolysis solution retention in the separator. On the other hand, when the porosity exceeds 60%, the strength of the separator would be unsatisfactory. The porosity is more preferably in the range of 35 to 50%.

The separator preferably has an air permeability of not more than 600 sec/100 $cm^3$. When the air permeability exceeds 600 sec/100 $cm^3$, it would be difficult to provide high lithium ion mobility in the separator. The lower limit of the air permeability is preferably 100 sec/100 $cm^3$, because, when the air permeability is less than 100 sec/100 $cm^3$, the strength of the separator would be unsatisfactory. The upper limit of the air permeability is preferably 500 sec/100 $cm^3$, and the lower limit of the air permeability is more preferably 150 sec/100 $cm^3$.

4) Nonaqueous Electrolysis Solution

The nonaqueous electrolysis solution is a liquid electrolyte prepared by dissolving an electrolyte in a nonaqueous solution.

The nonaqueous solvent may be any nonaqueous solution commonly known as a solvent for lithium rechargeable batteries, and is not particular limited. However, it is preferred to use a nonaqueous solvent composed mainly of a mixed solvent. This mixed solvent is composed of propylene carbonate (PC) or ethylene carbonate (EC) and at least one nonaqueous solvent, with the number of donors being not more than 18, having lower viscosity than PC or EC (thereinafter referred to as "second solvent").

For example, linear carbonates are preferred as the second solvent. Among others, dimethyl carbonate (DMC), methylethyl carbonate (MEC), and diethyl carbonate (DEC), ethyl propionate, methyl propionate, γ-butyrolactone (γ-BL), acetonitrile (AN), ethyl acetate (EA), toluene, xylene, and methyl acetate (MA) are preferred. These second solvents may be used alone or as a mixture of two or more. In particular, the number of donors of the second solvent is more preferably not more than 15.5.

The second solvent preferably has a viscosity of not more than 28 mp at 25° C.

The content of EC or PC in the mixed solvent is preferably 10 to 80% by volume, more preferably 20 to 75% by volume.

More preferred mixed solvents are a mixed solvent composed of EC and MEC, a mixed solvent composed of EC, PC, and MEC, a mixed solvent composed of EC, MEC, and DEC, a mixed solvent composed of EC, MEC, and DMC, and a mixed solvent composed of EC, MEC, PC, and DEC. In these mixed solvents, the content of MEC is preferably 30 to 80% by volume, more preferably 40 to 70% by volume.

Electrolytes, which may be contained in the nonaqueous electrolysis solution, include, for example, lithium salts (electrolytes), such as lithium perchlorate ($LiClO_4$), lithium phosphate hexafluoride ($LiPF_6$), lithium borofluoride ($LiBF_4$), arsenic lithium hexafluoride ($LiAsF_6$), lithium trifluoromethanesulfonate ($LiCF_3SO_3$), lithium bistrifluoromethylsulfonylimide [$LiN(CF_3SO_2)_2$], and lithium bispentafluoroethylsulfonylimide [$LiN(C_2F_5SO_2)_2$]. Among them, $LiPF_6$ and $LiBF_4$ are preferred.

The amount of the electrolyte dissolved in the nonaqueous solvent is preferably 0.5 to 2.0 mol/liter.

The amount of the nonaqueous electrolysis solution is preferably 2 to 6 g per unit capacity (Ah) of the battery. The reason for this is as follows. When the amount of the nonaqueous electrolysis solution is less than 2 g/Ah, the ion conductivity of the positive electrode and the negative electrode could not be kept on a satisfactory level. On the other hand, when the amount of the nonaqueous electrolysis solution exceeds 6 g/Ah, this large amount of nonaqueous electrolysis solution is likely to make it difficult to conduct hermetical sealing. The amount of the nonaqueous electrolysis solution is more preferably in the range of 4 to 5.5 g/hr.

Next, preferred embodiments of a production process of the rechargeable battery with a nonaqueous electrolysis solution according to the present invention will be described.

A cylindrical group of electrodes, wherein the positive electrode, the negative electrode, and the separator are spirally disposed, are first prepared. This is inserted into an outer can, followed by drying under reduced pressure at room temperature or with heating. Further, the compound represented by formula (1) is housed within the battery, and the nonaqueous electrolysis solution is poured into the battery, followed by hermetical sealing to produce a cylindrical rechargeable battery with a nonaqueous electrolysis solution:

$$X\text{—}O\text{—}CO\text{—}R \qquad (1)$$

wherein X represents a group which, upon decomposition of the compound caused by a rise in temperature, is eliminated to evolve a gas insoluble or slightly soluble in the electrolysis solution; and R represents a group which controls the decomposition temperature of the compound, the group R having, in the form of a compound represented by chemical formula $RH^1$, a hydrogen atom $H^1$ with an acid dissociation equilibrium constant (pKa) of not more than 13.

According to the present invention, the group X in formula (1) represents a substituted or unsubstituted alkyl group having 3 to 7 carbon atoms, preferably a substituted or unsubstituted alkyl group having 3 to 5 carbon atoms, and specific examples thereof include propyl, isopropyl, butyl, sec-butyl, isobutyl, tert-butyl, pentyl, isopentyl, neopentyl, and tert-pentyl groups. More preferably, group X may be selected from the group consisting of isopropyl, sec-butyl, isobutyl, tert-butyl, and tert-pentyl groups. Group X is particularly preferably a tert-butyl group.

According to a preferred embodiment of the present invention, the hydrogen atom $H^1$ in the compound represented by chemical formula $RH^1$ is bonded to an oxygen or nitrogen atom.

According to the present invention, the decomposition temperature of the compound represented by formula (1) can be regulated in the range of 100 to 150° C. by properly selecting the group R.

Methods for housing the compound represented by formula (1) in the battery include, for example, a method wherein the compound represented by formula (1) dissolved in an electrolysis solution to prepare a solution which is then housed in the battery, a method wherein the compound represented by formula (1) is housed in a powder or particulate form in the battery, a method wherein the compound represented by formula (1) is dissolved in a solvent to prepare a solution which is then poured into the battery followed by drying at room temperature or heat drying under reduced pressure, and a method wherein the compound represented by formula (1) is molded to prepare a molded product which is then hermetically sealed in a film, such as a polyethylene film, and housed within the battery.

The solvent for dissolving the compound represented by formula (1) is preferably an organic solvent having a boiling point of 140° C. or below. organic solvents usable herein include, for example, benzene, toluene, n-hexane, n-heptane, n-octane, cyclohexane, methyl alcohol, ethyl alcohol, n-propyl alcohol, isopropyl alcohol, acetone, methyl ethyl ketone, tetrahydrofuran, dioxane, diethyl ether, acetic acid, ethyl acetate, carbon tetrachloride, chloroform, methylene chloride, and carbon disulfide. When the boiling point of the organic solvent is above 140° C., it would be difficult to rapidly evaporate and remove the solvent at a temperature of 100° C. or below. The lower limit of the boiling point of the organic solvent is preferably 0° C. When the boiling point of the organic solvent is below 0° C., the organic solvent is brought to a gas at room temperature and thus is difficult to handle. The solvent may not be used when the above compound is liquid.

The solvent for dissolving the compound represented by formula (1) is preferably removed by heating to a temperature of 100° C. or below. The reason for this is as follows. Heating the battery is preferred because the removal of the solvent by evaporation is accelerated. A heating temperature above 100° C. would unfavorably cause significant heat shrinkage of the separator. Large heat shrinkage causes a difference between the positive electrode and the negative electrode within the group of electrodes, disadvantageously resulting in deteriorated cycling characteristics. The heat shrinkage is likely to be significant when the separator used is formed of a porous film comprising polyethylene or polypropylene.

The compound represented by formula (1) is a derivative of a compound represented by formula (2):

$$H^1\text{—R} \tag{2}$$

The compound represented by chemical formula $RH^1$ preferably has an acid dissociation equilibrium constant (pKa) of not more than 13. When the compound represented by chemical formula $RH^1$ has a hydrogen atom having an acid dissociation equilibrium constant (pKa) of not more than 13, for example, a compound represented by formula tBu—O—CO—R, which is the compound represented by formula (1) with X being a tert-butyl group, can be decomposed at 150° C. or below to evolve carbon dioxide and 2-methylpropene. This can further improve the safety of the battery. Only one or two or more hydrogen atoms having an acid dissociation equilibrium constant (pKa) of not more than 13 may be present in the molecule.

The hydrogen atom $H^1$ in the compound represented by formula (2) is preferably bonded to an oxygen atom or a nitrogen atom. When the hydrogen atom $H^1$ in the compound represented by formula (2) is bonded to an oxygen atom or a nitrogen atom, the decomposition reaction as a result of a temperature rise of the compound represented by chemical formula X—O—CO—R is promoted.

The compound represented by formula (2) is specifically selected from phenol, 1,2-dihydroxybenzene, 1,3-dihydroxybenzene, 1,4-dihydroxybenzene, 1,2,3-trihydroxybenzene, 1,2,3-trihydroxy-5-methylbenzene, 2-methylphenol, 3-methylphenol, 4-methylphenol, 2-methoxyphenol, 3-methoxyphenol, 4-methoxyphenol, 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,3-difluorophenol, 2,4-difluorophenol, 2,5-difluorophenol, 2,6-difluorophenol, 3,4-difluorophenol, 3,5-difluorophenol, 2,3-chlorophenol, 2,4-dichlorophenol, 2,5-dichlorophenol, 2,6-dichlorophenol, 3,4-dichlorophenol, 3,5-dichlorophenol, 2,3-dibromophenol, 2,4-dibromophenol, 2,5-dibromophenol, 2,6-dibromophenol, 3,4-dibromophenol, 3,5-dibromophenol, 2,3-dimethylphenol, 2,4-dimethylphenol, 2,5-dimethylphenol, 2,6-dimethylphenol, 3,4-dimethylphenol, 3,5-dimethylphenol, 2-nitrophenol, 3-nitrophenol, 4-nitrophenol, 2,3-dinitrophenol, 2,4-dinitrophenol, 2,5-dinitrophenol, 3,4-dinitrophenol, 4,4'-biphenol, 1-naphthol, 2-naphthol, imidazole, 2-methylimidazole, 2-ethylimidazole, 4-methylimidazole, 4-ethylimidazole, 2-phenylimidazole, 4-phenylimidazole, benzimidazole, indole, 2-methylindole, 2-phenylindole, pyrrole, 3-methylpyrrole, methylpyrrole, polypyrrole, 3-pyrroline, pyrrolidine, pyrazole, pyrazolidine, 1,2,3-triazole, 1,2,4-triazole, and 5-hydroxy-2-(hydroxymethyl)-4H-pyran-4-one. The compounds represented by formula (1) may be used alone or as a mixture of two or more.

An embodiment of the present invention will be described with reference to the accompanying drawings. In FIG. 1, numeral 1 designates a container, numeral 2 an insulator, numeral 3 a group of electrodes, numeral 4 a positive electrode, numeral 5 a separator, and numeral 6 a negative electrode. The group of electrodes 3 have been prepared by stacking the positive electrode 4, the separator 5, and the negative electrode 6 in that order on top of one another and spirally winding the stack in such a manner that the negative electrode faces outward. Numeral 7 designates an insulating plate, numeral 8 a sealing plate, numeral 9 a positive electrode terminal, and numeral 10 a positive electrode lead. An electrolysis solution (not shown) is contained in the container 1, and the container 1 is hermetically sealed by the sealing plate 8.

EXAMPLES

Examples of the present invention will be described in more detail with reference to the accompanying drawings.

Example 1

Phenol (0.01 mole) was dissolved in 100 ml of dichloromethane. Di-tert-butoxy-dicarbonate (0.015 mole) and 4-dimethylpyridine (0.001 mole) were added to the solution while stirring. The mixture was stirred for 4 hr. The solvent was removed by distillation under reduced pressure. Impurities were removed from the residue by column chromatography on silica gel, followed by recrystallization from toluene. Thus, o-t-butoxycarbonylphenol was prepared.

91% by weight of a lithium cobalt oxide powder [$Li_xCoO_2$ ($0.8 \leq x \leq 1$)] having an average particle diameter of 5 μm, 3% by weight of acetylene black, 3% by weight of graphite, and 3% by weight of polyvinylidene fluoride were added to N-methylpyrrolidone, followed by mixing to prepare a slurry. The slurry was coated onto both sides of a current collector of a 25-μm aluminum foil. Thereafter, the coated current collector was dried by hot air to remove N-methylpyrrolidone and then pressed to prepare a positive electrode having an electrode density of 3 g/cm³.

97% by weight of a powder of a mesophase pitch carbon fiber which had been heat treated at 3000° C. (fiber diameter 8 μm, average fiber length 20 μm, average lattice spacing (d002) 0.3360 nm, specific surface area as measured by the BET method 2 m²/g) as a carbonaceous material was mixed with 2% by weight of a styrene butadiene rubber and 1% by weight of carboxymethylcellulose. The mixture was slurried in water as a solvent. The slurry was then coated onto both sides of a current collector of a copper foil. Thereafter, the coated current collector was dried and then pressed to prepare a negative electrode having an electrode density of 1.3 g/cm$^3$.

A polyethylene-polypropylene porous film having a thickness of 25 μm, a percentage heat shrinkage of 18% as measured under conditions of 120° C. and one hr, and a porosity of 40% was provided as a separator.

The positive electrode, the separator, and the negative electrode sheet were stacked in that order on top of one another. The stack was spirally wound to prepare a group of electrodes in a cylindrical form. The group of electrodes is housed in a cylindrical outer can, followed by heat drying in vacuo.

Lithium phosphate hexafluoride (LiPF$_6$) was dissolved, in an amount of 1 mol per liter, in a mixed solvent composed of ethylene carbonate (EC) and methylethyl carbonate (MEC) (mixing volume ratio=1:2) to prepare a nonaqueous electrolysis solution.

5 g of the nonaqueous electrolysis solution per 1 Ah of the capacity of the battery was weighed. 0.1 g of a powder of o-t-butoxycarbonylphenol was dissolved in the weighed nonaqueous electrolysis solution. The solution was poured into the outer can containing the group of electrodes, followed by hermetical sealing to assemble a cylindrical rechargeable battery, with a nonaqueous electrolysis solution, having a diameter of 18 mm and a height of 65 mm.

Example 2

A cylindrical rechargeable battery, with a nonaqueous electrolysis solution, having the same construction as used in Example 1 was assembled in the same manner as Example 1, except that 0.1 g of a powder of o-tert-butoxycarbonylphenol was pressed at a pressure of 400 kg/cm$^2$, formed, and covered with a polyethylene film and the assembly was housed as an electrode pressing plate in the cylindrical outer can.

Example 3

A cylindrical rechargeable battery, with a nonaqueous electrolysis solution, having the same construction as used in Example 1 was assembled in the same manner as Example 1, except that 0.1 g of a powder of o-tert-butoxycarbonylphenol was placed and hermetically sealed in a polyethylene film bag having a size of 40 mm in length and 40 mm in width, the bag was then formed into a sheet and this sheet, together with the positive electrode, the separator, and the negative electrode, was spirally wound to prepare a group of electrodes in a cylindrical form.

Example 4

A cylindrical rechargeable battery, with a nonaqueous electrolysis solution, having the same construction as used in Example 1 was assembled in the same manner as Example 1, except that o-tertbutoxycarbonylmethylphenol was synthesized using 4-hydroxytoluene instead of phenol and then used in the assembly of the battery.

Example 5

A cylindrical rechargeable battery, with a nonaqueous electrolysis solution, having the same construction as used in Example 2 was assembled in the same manner as Example 2, except that o-tert-butoxycarbonylmethylphenol was used instead of o-tert-butoxycarbonylphenol.

Example 6

A cylindrical rechargeable battery, with a nonaqueous electrolysis solution, having the same construction as used in Example 3 was assembled in the same manner as Example 3, except that o-tert-butoxycarbonylmethylphenol was used instead of o-tert-butoxycarbonylphenol.

Example 7

A cylindrical rechargeable battery, with a nonaqueous electrolysis solution, having the same construction as used in Example 1 was assembled in the same manner as Example 1, except that N-tert-butoxycarbonylpyrrole was synthesized using pyrrole instead of phenol and then used in the assembly of the battery.

Example 8

A cylindrical rechargeable battery, with a nonaqueous electrolysis solution, having the same construction as used in Example 2 was assembled in the same manner as Example 2, except that N-tert-butoxycarbonylpyrrole was used instead of o-tert-butoxycarbonylphenol.

Example 9

A cylindrical rechargeable battery, with a nonaqueous electrolysis solution, having the same construction as used in Example 3 was assembled in the same manner as Example 3, except that N-tert-butoxycarbonylpyrrole was used instead of o-tert-butoxycarbonylphenol.

Comparative Example 1

87% by weight of a lithium cobalt oxide powder [Li$_x$CoO$_2$ (0.8≦x≦1)] having an average particle diameter of 5 μm, 4% by weight of lithium carbonate, 3% by weight of acetylene black, 3% by weight of graphite, and 3%by weight of polyvinylidene fluoride were added to N-methylpyrrolidone, followed by mixing to prepare a slurry. The slurry was coated on both sides of a current collector of a 25- μm aluminum foil. Thereafter, the coated current collector was dried by hot air to remove N-methylpyrrolidone and then pressed to prepare a cathode having an electrode density of 3 g/cm$^3$. A cylindrical rechargeable battery, with a nonaqueous electrolysis solution, having the same construction as used in Example 1 was assembled in the same manner as Example 1, except that o-tert-butoxycarbonylphenol was not dissolved in a nonaqueous electrolysis solution.

Figure 2:
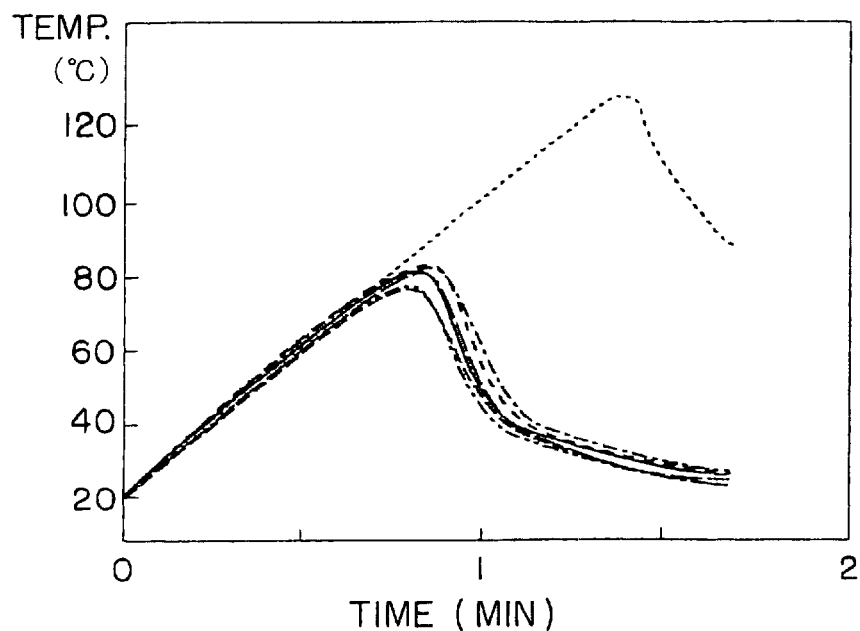
FIG. 2 is a diagram showing a change in outer wall temperature of batteries according to the present invention and a comparative battery over time in an overcharge test.

For the rechargeable batteries with a nonaqueous electrolysis solution prepared in Examples 1 to 9 and Comparative Example 1, a 10C 15V continuous overcharge test was carried out to measure the outer wall temperature of the batteries. For the rechargeable batteries with a nonaqueous electrolysis solution, the change in the outer wall temperature of the battery over time is shown in FIG. 2. As is apparent from FIG. 2, the highest arrival temperature in the overcharge test of the batteries according to the present invention was lower than that of the battery of Comparative Example 1, indicating that the batteries according to the present invention are safer than the comparative battery.

Figure 3:
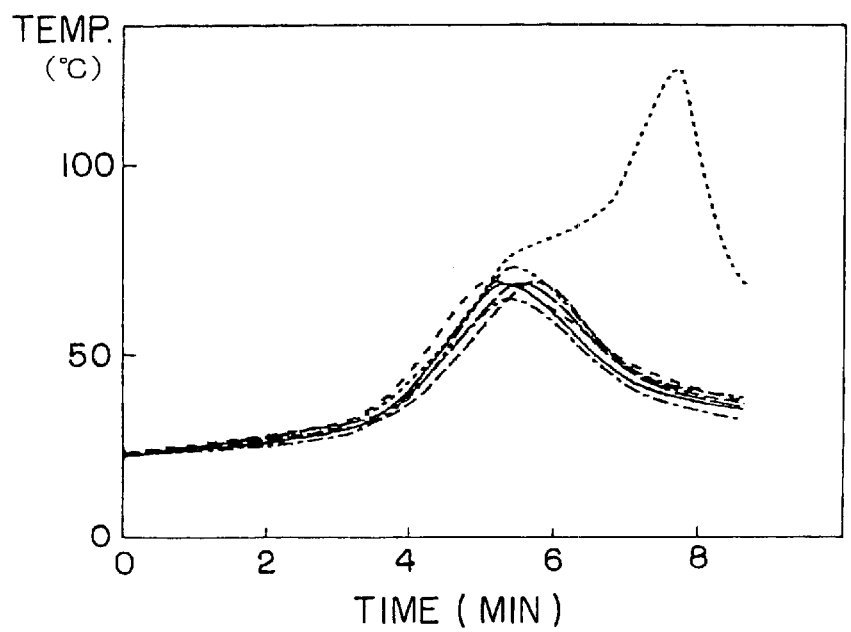
FIG. 3 is a diagram showing a change in outer wall temperature of batteries according to the present invention and a comparative battery over time in an external short circuit test.

Further, for the rechargeable batteries with a nonaqueous electrolysis solution prepared in Examples 1 to 9 and Comparative Example 1, charging was carried out to 4.2 V at a charge current of 1 A and then continued at a voltage of 4.2 V for 2 hr. After the charging, an external short circuit test was carried out to measure the outer wall temperature of the batteries. For the rechargeable batteries with a nonaqueous electrolysis solution, the change in the outer wall temperature of the battery over time is shown in FIG. 3. As is apparent from FIG. 3, the highest arrival temperature in the external short circuit test of the batteries according to the present invention was much lower than that of the battery of Comparative Example 1, indicating that the batteries according to the present invention are much safer than the comparative battery.

As is apparent from the foregoing description, the present invention can provide highly safe batteries.

What is claimed is:

1. A battery comprising a positive electrode, a negative electrode, a separator, an electrolysis solution, and a hermetically sealed container, wherein said hermetically sealed container comprising in its interior a compound represented by formula (1):

$$X\text{---}O\text{---}CO\text{---}R \quad (1),$$

wherein

X represents a group which, upon decomposition of the compound caused by a rise in temperature, is eliminated to evolve a gas insoluble or slightly soluble in the electrolysis solution; and R represents a group which controls the decomposition temperature of the compound, the group R having, in the form of a compound represented by chemical formula $RH^1$, a hydrogen atom $H^1$ with an acid dissociation equilibrium constant (pKa) constant of not more than 13.

2. The battery according to claim 1, wherein the group X in formula (I) represents a substituted or unsubstituted alkyl group having 3 to 7 carbon atoms.

3. The battery according to claim 1, wherein the group X in formula (1) is a butyl group.

4. The battery according to claim 1, wherein the hydrogen atom $H^1$ in the compound represented by chemical formula $RH^1$ is bonded to an oxygen or nitrogen atom.

5. The battery according to claim 1, wherein the positive electrode comprises a positive electrode layer comprising an active material, the positive electrode layer being supported on a current collector.

6. The battery according to claim 5, wherein the active material is selected from the group consisting of manganese dioxides, lithium-containing manganese oxides, lithium-containing manganese aluminum oxides, lithium-containing manganese iron oxides, lithium-containing manganese aluminum iron oxides, lithium-containing nickel oxides, lithium-containing cobalt oxides, lithium-containing nickel cobalt oxides, lithium-containing iron oxides lithium-containing vanadium oxides, chalcogen compounds, and mixtures thereof.

7. A battery, comprising a positive electrode, a negative electrode, a separator, an electrolysis solution, and a hermetically sealed container, wherein said hermetically sealed container comprising in its interior a compound represented by formula (1):

$$X\text{---}O\text{---}CO\text{---}R \quad (1)$$

wherein

X represents a group selected from the group consisting of substituted or unsubstituted propyl, butyl, and pentyl groups; and R represents a group which controls the decomposition temperature of the compound, the group R having, in the form of a compound represented by chemical formula $RH^1$, a hydrogen atom $H^1$ with an acid dissociation equilibrium constant (pKa) constant of not more than 13.

8. The battery according to claim 7, wherein the group X in formula (1) is a butyl group.

9. The battery according to claim 7, wherein the hydrogen atom $H^1$ in the compound represented by chemical formula $RH^1$ is bonded to an oxygen or nitrogen atom.

10. The battery according to claim 7, wherein the positive electrode comprises a positive electrode layer comprising an active material, the positive electrode layer being supported on a current collector.

11. The battery according to claim 10, wherein the active material is selected from the group consisting of manganese dioxides, lithium-containing manganese oxides, lithium-containing manganese aluminum oxides, lithium-containing manganese iron oxides, lithium-containing manganese aluminum iron oxides, lithium-containing nickel oxides, lithium-containing cobalt oxides, lithium-containing nickel cobalt oxides, lithium-containing iron oxides, lithium-containing vanadium oxides, chalcogen compounds, and mixtures thereof.

12. The battery according to claim 7, wherein the negative electrode comprises a negative electrode layer supported on a current collector.

13. The battery according to claim 7, wherein the separator comprises porous films or nonwoven fabrics.

14. The battery according to claim 13, wherein the separator comprises porous films comprising polyethylene or polypropylene.

15. The battery according to claim 13, wherein the separator has a porosity of 30 to 60%.

16. The battery according to claim 13, wherein the separator has an air permeability of not more than 600 sec/100 cm$^3$.

17. The battery according to claim 7, wherein the electrolysis solution comprises a nonaqueous electrolysis solution.

18. The battery according to claim 17, wherein the nonaqueous electrolysis solution comprises a mixture of a first solvent comprising propylene carbonate or ethylene carbonate and a second solvent comprising a nonaqueous solvent having lower viscosity than the first solvent.

19. The battery according to claim 17, wherein the nonaqueous electrolysis solution contains an electrolyte selected from the group consisting of lithium perchlorate, lithium phosphate hexafluoride, lithium borofluoride, arsenic lithium hexafluoride, lithium trifluoromethanesulfonate, lithium bistrifluoromethylsulfonylimide, lithium bispentafluoroethylsulfonylimide, and mixtures thereof.

20. The battery according to claim 7, wherein the compound represented by formula (1) has a decomposition temperature of 100 to 150° C.

21. The battery according to claim 1, wherein the negative electrode comprises a negative electrode layer supported on a current collector.

22. The battery according to claim 1, wherein the separator comprises porous films or nonwoven fabrics.

23. The battery according to claim 22, wherein the separator comprises porous films comprising polyethylene or polypropylene.

24. The battery according to claim 22, wherein the separator has a porosity of 30 to 60%.

25. The battery according to claim 22, wherein the separator has an air permeability of not more than 600 sec/100 cm$^3$.

26. The battery according to claim 1, wherein the electrolysis solution comprises a nonaqueous electrolysis solution.

27. The battery according to claim 26, wherein the nonaqueous electrolysis solution comprises a mixture of a first solvent comprising propylene carbonate or ethylene carbonate and a second solvent comprising a nonaqueous solvent having lower viscosity than the first solvent.

28. The battery according to claim 26, wherein the nonaqueous electrolysis solution contains an electrolyte selected from the group consisting of lithium perchlorate, lithium phosphate hexafluoride, lithium borofluoride, arsenic lithium hexafluoride, lithium trifluoromethanesulfonate, lithium bistrifluoromethylsulfonylimide, lithium bispentafluoroethylsulfonylimide, and mixtures thereof.

29. The battery according to claim 1, wherein the compound represented by formula (1) has a decomposition temperature of 100 to 150° C.

30. The battery according to claim 1, wherein the group X in formula (I) is a tert-butyl group.

31. The battery according to claim 1, wherein the compound represented by the chemical formula $RH^1$ is selected from the group consisting of phenol, 1,2-dihydroxybenzene, 1,3-dihydroxybenzene, 1,4-dihydroxybenzene, 1,2,3-trihydroxybenzene, 1,2,3-trihydroxy-5-methylbenzene, 2-methylphenol, 3-methylphenol, 4-methylphenol, 2-methoxyphenol, 3-methoxyphenol, 4-methoxyphenol, 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,3-fluorophenol, 2,4-difluorophenol, 2,5-difluorophenol, 2,6-difluorophenol, 3,4-difluorophenol, 3,5-difluorophenol, 2,3-dichlorophenol, 2,4-dichlorophenol, 2,5-dichlorophenol, 2,6-dichlorophenol, 3,4-dichlorophenol, 3,5-dichlorophenol, 2,3-bromophenol, 2,4-dibromophenol, 2,5-dibromophenol, 2,6-dibromophenol, 3,4-dibromophenol, 3,5-dibromophenol, 2,3-dimethylphenol, 2,4-dimethylphenol, 2,5-dimethylphenol, 2,6-dimethylphenol, 3,4-dimethylphenol, 3,5-dimethylphenol, 2-nitrophenol, 3-nitrophenol, 4-nitrophenol, 2,3-dinitrophenol, 2,4-dinitrophenol, 2,5-dinitrophenol, 3,4-dinitrophenol, 4,4'-biphenol, 1-naphthol, 2-naphthol, imidazole, 2-methylimidazole, 2-ethylimidazole, 4-methylimidazole, 4-ethylimidazole, 2-phenylimidazole, 4-phenylimidazole, benzimidazole, indole, 2-methylindole, 2-phenylindole, pyrrole, 3-methylpyrrole, methylpyrrole, polypyrrole, 3-pyrroline, pyrrolidine, pyrazole, pyrazolidene, 1,2,3-triazole, 1,2,4-triazole, 5-hydroxy-2-(hydroxymethyl)-4H-pyran-4-one, and mixtures thereof.

32. The battery according to claim 7, wherein the group X in formula (I) is a tert-butyl group.

33. The battery according to claim 7, wherein the compound represented by the chemical formula $RH^1$ is selected from the group consisting of phenol, 1,2-dihydroxybenzene, 1,3-dihydroxybenzene, 1,4-dihydroxybenzene, 1,2,3-trihydroxybenzene, 1,2,3-trihydroxy-5-methylbenzene, 2-methylphenol, 3-methylphenol, 4-methylphenol, 2-methoxyphenol, 3-methoxyphenol, 4-methoxyphenol, 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,3-fluorophenol, 2,4-difluorophenol, 2,5-difluorophenol, 2,6-difluorophenol, 3,4-difluorophenol, 3,5-difluorophenol, 2,3-dichlorophenol, 2,4-dichlorophenol, 2,5-dichlorophenol, 2,6-dichlorophenol, 3,4-dichlorophenol, 3,5-dichlorophenol, 2,3-bromophenol, 2,4-dibromophenol, 2,5-dibromophenol, 2,6-dibromophenol, 3,4-dibromophenol, 3,5-dibromophenol, 2,3-dimethylphenol, 2,4-dimethylphenol, 2,5-dimethylphenol, 2,6-dimethylphenol, 3,4-dimethylphenol, 3,5-dimethylphenol, 2-nitrophenol, 3-nitrophenol, 4-nitrophenol, 2,3-dinitrophenol, 2,4-dinitrophenol, 2,5-dinitrophenol, 3,4-dinitrophenol, 4,4'-biphenol, 1-naphthol, 2-naphthol, imidazole, 2-methylimidazole, 2-ethylimidazole, 4-methylimidazole, 4-ethylimidazole, 2-phenylimidazole, 4-phenylimidazole, benzimidazole, indole, 2-methylindole, 2-phenylindole, pyrrole, 3-methylpyrrole, methylpyrrole, polypyrrole, 3-pyrroline, pyrrolidine, pyrazole, pyrazolidene, 1,2,3-triazole, 1,2,4-triazole, 5-hydroxy-2-(hydroxymethyl)-4H-pyran-4-one, and mixtures thereof.

\* \* \* \* \*